US011980579B2

(12) United States Patent
Iwase et al.

(10) Patent No.: US 11,980,579 B2
(45) Date of Patent: May 14, 2024

(54) WHEELCHAIR

(71) Applicant: Mazda Motor Corporation, Hiroshima (JP)

(72) Inventors: Takashi Iwase, Aki-gun (JP); Isao Toda, Aki-gun (JP); Akira Yasutake, Aki-gun (JP); Tsuyoshi Arinaga, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 615 days.

(21) Appl. No.: 17/174,357

(22) Filed: Feb. 12, 2021

(65) Prior Publication Data

US 2021/0282989 A1 Sep. 16, 2021

(30) Foreign Application Priority Data

Mar. 13, 2020 (JP) ................................. 2020-043670

(51) Int. Cl.
*B62M 1/16* (2006.01)
*A61G 5/10* (2006.01)

(52) U.S. Cl.
CPC ......... *A61G 5/1032* (2013.01); *A61G 5/1035* (2013.01)

(58) Field of Classification Search
CPC ............................ A61G 5/1032; A61G 5/1035
USPC ............. 188/2 F, 165; 280/246, 250.1, 304.1
See application file for complete search history.

(56) References Cited

U.S. PATENT DOCUMENTS

| | | | | |
|---|---|---|---|---|
| 5,228,709 A * | 7/1993 | Kao | A61G 5/128 | 280/5.2 |
| 6,371,502 B1 * | 4/2002 | Howlett | A61G 5/025 | 280/258 |
| 9,572,732 B2 * | 2/2017 | Beeri | A61G 5/068 | |
| 11,684,528 B2 * | 6/2023 | Gupta | A61G 5/1029 | 188/7 |
| 2011/0070057 A1 * | 3/2011 | Kitchin | A61G 3/062 | 414/544 |

* cited by examiner

*Primary Examiner* — Christopher P Schwartz
(74) *Attorney, Agent, or Firm* — XSENSUS LLP

(57) ABSTRACT

The wheelchair includes a seating portion, body frames that support the seating portion, wheels that are rotatably supported by the body frames, an engaging portion, a left brake that brakes a left rear wheel, and a coupling portion that couples the engaging portion and the left brake to each other. The engaging portion is capable of switching between an engagement attitude for engaging a vehicle body member that forms an opening of a vehicle and a disengagement attitude for releasing the engagement with the vehicle body member. The coupling portion transmits the movement of the engaging portion to the left brake when the engaging portion makes an attitude change from the disengagement attitude to the engagement attitude. This operates the left brake when the attitude of the engaging portion switches from the disengagement attitude to the engagement attitude and brakes the left rear wheel.

20 Claims, 10 Drawing Sheets

WHEELCHAIR

CROSS-REFERENCE TO RELATED APPLICATION

The present application contains subject matter related to Japanese Priority Application 2020-043670, filed in the Japanese Patent Office on Mar. 13, 2020, the entire contents of which being incorporated herein by reference in its entirety.

BACKGROUND

Field

The present disclosure relates to a wheelchair.

Description of the Related Art

Wheelchairs are used by elderly people, disabled people (physically handicapped people), and the like. Such wheelchair users may get on and off vehicles such as automobiles. At this time, such a wheelchair user may get on and off a vehicle with the assistance of a caregiver or may get on and off a vehicle by himself or herself.

Patent document 1 discloses an example of the structure for assisting a wheelchair user in getting on and off a vehicle. Patent document 1 discloses a getting-on-and-off assist mechanism including an arm rotatably supported by a seat back and a transfer board attached to the end of the arm.

The arm is rotatably supported by the frame of the seat back close to the door and the straight portion of the end portion can rotate between the attitude along the side surface of the seat back and the attitude along the side surface of the seat portion. The transfer board is rotatable with respect to the end portion of the arm and is substantially parallel to the seat portion when the transfer board is open, and the other end thereof projects to the outside of the door. A hook for engaging the frame of the wheelchair is provided at the end of the transfer board.

In the getting-on-and-off assist mechanism disclosed in patent document 1, when getting on and off the vehicle, the wheelchair user opens the transfer board and engages the hook with the frame of the wheelchair, so that the wheelchair user can move between the seat of the wheelchair and the seat of the vehicle via the transfer board.

PRIOR ART DOCUMENTS

Patent Documents

[Patent document 1] JP-UM-A-07-31456

SUMMARY

By the way, when trying to get on and off the vehicle, the wheelchair user generally applies the brake of the wheelchair. However, if the wheelchair user forgets to apply the brake, the wheelchair may move and become unstable when trying to transfer to and from the vehicle. That is, when the wheelchair user tries to transfer between the wheelchair and the vehicle, the force in the direction opposite to the movement of the wheelchair user acts on the wheelchair and the wheelchair may move if the wheelchair is movable because the wheelchair user forgets to apply the brake. Such movement of the wheelchair at the time of getting on and off is not preferable because the wheelchair user who transfers becomes insecure and the transfer becomes difficult.

The present disclosure addresses the problems described above with objects of providing a wheelchair that can reliably stop the movement of the wheelchair when the wheelchair user gets on and off a vehicle and enables the wheelchair user to get on and off stably.

Means for Solving the Problems

According to an aspect of the present disclosure, there is provided a wheelchair including a seating portion on which a wheelchair user sits; a body frame that supports the seating portion; a wheel rotatably supported by the body frame; an engaging portion capable of switching between an engagement attitude for engaging a vehicle body member that forms an opening of a vehicle and a disengagement attitude for releasing the engagement with the vehicle body member; and a brake portion that brakes the wheel when the engaging portion makes an attitude change from the disengagement attitude to the engagement attitude.

In the wheelchair according to the aspect described above, since there is the braking portion that brakes the wheel in conjunction with the attitude change from the disengagement attitude to the engagement attitude when the engaging portion makes the attitude change, even when the wheelchair user transfers to or from the vehicle if the wheelchair user or the caregiver forgets to apply the brake, the wheelchair user can transfer stably because the wheel is braked due to the attitude change of the engaging portion to the engagement attitude.

In the wheelchair according to the aspect described above, in plan view of the wheelchair as seen from above, the brake portion brakes one of a plurality of wheels that is farthest from the engaging portion engaged with the vehicle body member of the vehicle, the wheel being one of the plurality of wheels.

As described above, by braking one of the plurality of wheels that is farthest from the engaging portion engaged with the vehicle body member of the vehicle in a plan view of the wheelchair as seen from above, the movement such as the rotation of the wheelchair in a plan view can be effectively stopped. That is, even if the force applied to the wheelchair tries to rotate the wheelchair about the engaging portion engaged with the vehicle body member when the wheelchair user transfers, the movement such as the rotation of the wheelchair can be effectively stopped by braking one of the plurality of wheels that is farthest from the engaging portion using the braking portion.

The wheelchair according to the aspect described above may further include a coupling portion that has a link and a joint and couples the engaging portion and the brake portion to each other.

As described above, by coupling the engaging portion and the braking portion to each other via the coupling portion, the movement of the engaging portion is transmitted to the braking portion via the coupling portion when the engaging portion is engaged with the vehicle body member, and the braking portion can reliably brake the wheel.

The wheelchair according to the aspect described above may further include a detection portion configured to detect whether the engaging portion is in the engagement attitude or the disengagement attitude, and a control portion configured to control the braking portion so as to brake the wheel when receiving detected information indicating that the engaging portion is in the engagement attitude.

By outputting a signal for braking the wheel to the braking portion when the detected information (detected information indicating that the engaging portion has made an attitude change from the disengagement attitude to the engagement attitude) indicating that the engaging portion is in the engagement attitude is input to the control portion as described above, even if the wheelchair user or the like forgets to apply the brake of the wheelchair and tries to transfer to or from the vehicle, the wheelchair is braked automatically. Accordingly, it is possible to get on and off stably when the above structure is adopted.

The wheelchair according to the aspect described above may further include a driving source configured to generate a driving force that assists rotation of the wheel when an assist instruction is input by the wheelchair user, in which the braking portion may be built in or attached to the driving source.

By adopting the structure in which the braking portion is attached to or built in the driving source as described above, the movement such as the rotation of the wheelchair can be reliably stopped without being affected by the frictional state between the wheel and the tire. It should be noted here that, for example, a motor with an electromagnetic brake may be an example of the driving source having an attached or built-in braking portion.

In the wheelchair according to the aspect described above, the control portion may control the braking portion so as to release the braking of the wheel when the engaging portion makes an attitude change from the engagement attitude to the disengagement attitude and the assist instruction is input by the wheelchair user.

When the braking is not released if the engaging portion simply makes an attitude change from the engagement attitude to the disengagement attitude and the braking of the wheel is released if the assist instruction is input by the wheelchair user in addition as described above, the wheelchair is prevented from moving undesirably when the engaging portion simply makes an attitude change from the engagement attitude to the disengagement attitude with respect to the vehicle body member and the assist instruction is not input yet, thereby advantageously ensuring higher safety.

The wheelchair according to the aspect described above may further include a driving source configured to generate a driving force that assists rotation of the wheel when an assist instruction is input by the wheelchair user; and a torque detection portion configured to detect an input torque to the wheel, in which, when the engaging portion makes an attitude change from the disengagement attitude to the engagement attitude and the input torque is detected, the control portion may control the driving source so as to generate a torque that has the same magnitude as the input torque and is directed opposite to the input torque and applies the generated torque to the wheel, and the driving source may also function as the braking portion by generating the torque directed opposite to the input torque and applying the generated torque to the wheel.

When the driving source also functions as the braking portion and the torque that has the same magnitude as the applied torque and is directed opposite to the applied torque is applied to the wheel when the engaging portion is engaged with the vehicle body member (the engaging portion is in the engagement attitude), the rotation of the wheelchair when the wheelchair user tries to transfer to or from the vehicle can be suppressed.

An exemplary embodiment of the present disclosure will be described below with reference to the drawings. It should be noted here that the embodiment described below is an example of the present disclosure and the present disclosure is not limited to the following embodiment except for the essential structure thereof.

DETAILED DESCRIPTION

1. Structure of Wheelchair 1

Figure 1:
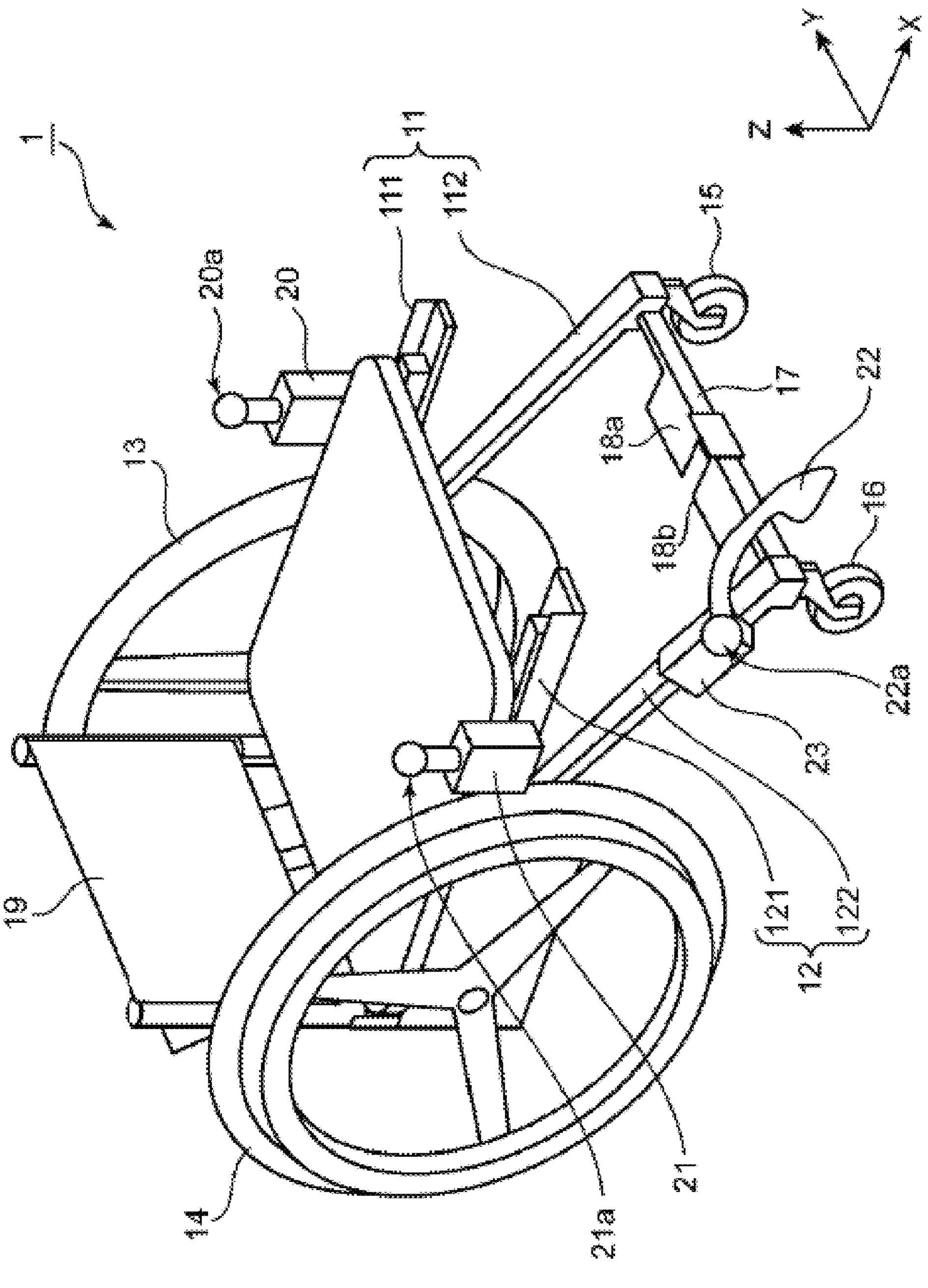
FIG. 1 is a perspective view illustrating the structure of a wheelchair according to an exemplary embodiment.

FIG. 1 is a perspective view illustrating the structure of a wheelchair 1 according to an embodiment of the present disclosure.

As illustrated in FIG. 1, the wheelchair 1 according to the embodiment includes body frames 11 and 12, rear wheels 13 and 14, front wheels 15 and 16, a footrest frame 17, footrests **18*a* and 18*b*, a seating portion 19, brakes 20 and 21, an engaging portion 22, and a coupling portion 23**.

In the wheelchair 1 according to the embodiment, the body frame includes the left body frame 11 and the right body frame 12. The left body frame 11 includes a main frame 111 and a sub-frame 112. The main frame 111 and the sub-frame 112 are joined on the rear side in the X-direction and the distance between these frames increases toward the front side in the X-direction. In other words, the main frame 111 and the sub-frame 112 of the left body frame 11 are provided so as to form a V-shape in side view from the Y-direction.

The right body frame 12 also has a main frame 121 and a sub-frame 122. The main frame 121 and sub-frame 122 of the right body frame 12 are also joined on the rear side in the X-direction, the distance between these frames increases toward the front side in the X-direction, and these frames are provided so as to form a V-shape in side view from the Y-direction.

The seating portion 19 is supported by the main frame 111 of the left body frame 11 and the main frame 121 of the right body frame 12. Although not described in detail, in the wheelchair 1 according to the embodiment, the seating portion 19 is detachable from and attachable to the left body frame 11 and the right body frame 12.

The left rear wheel 13 is rotatably supported by the left body frame 11. The right rear wheel 14 is rotatably supported by the right body frame 12.

The left front wheel 15 is rotatably supported by the end portion (front portion in the X-direction) of the sub-frame 112 of the left body frame 11. The right front wheel 16 is rotatably supported by the end portion (front portion in the X-direction) of the sub-frame 122 of the right body frame 12.

The footrest frame 17 extends in the Y-direction so as to connect the end portion of the sub-frame 112 of the left body frame 11 and the end portion of sub-frame 122 of the right body frame 12 to each other. The footrest 18*a* and the footrest 18*b* are attached to the footrest frame 17 and disposed side by side at intervals in the Y-direction.

The left brake (braking portion) 20 is the portion that brakes the left rear wheel 13 by a frictional force between the left brake 20 and the tire of the left rear wheel 13, and a lever 20*a* to be operated by the wheelchair user extends upward in the Z-direction. The right brake 21 is the portion that brakes the right rear wheel 14 by a frictional force between the right brake 21 and the tire of the right rear wheel 14, and a lever 21*b* to be operated by the wheelchair user extends upward in the Z-direction.

The engaging portion 22 has the end portion (front portion in the X-direction) of an arrowhead shape, and a mount portion 22*a* on the root side (the rear portion in the X-direction) thereof is attached to the sub-frame 122 of the right body frame 12. The engaging portion 22 is pivotable about the mount portion 22*a*.

The coupling portion 23 is attached to the sub-frame 122 of the right body frame 12 and transmits the movement (attitude change) of the engaging portion 22 to the left brake 20. The detailed structure of the coupling portion 23 will be described later.

2. Structure of Brakes 20 and 21

Figure 2:
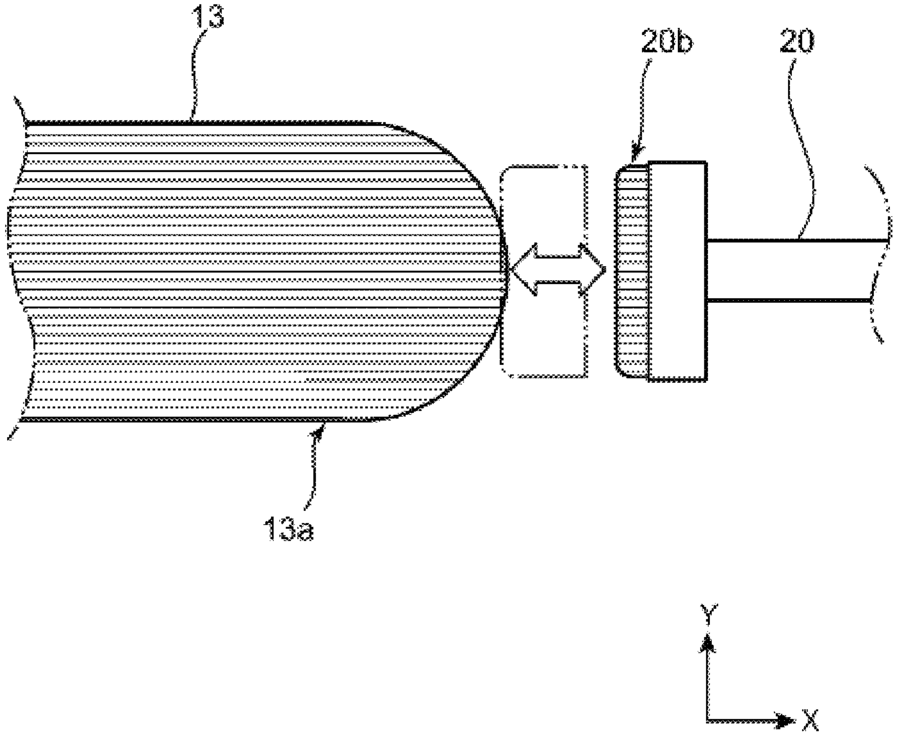
FIG. 2 is a plan view used to describe the braking of a left rear wheel by a left brake.

FIG. 2 is a plan view used to describe the braking by the left brake 20. Although FIG. 2 illustrates the left brake 20 as an example, the right brake 21 has the same structure.

As illustrated in FIG. 2, the left brake 20 has a brake shoe 20*b* provided movably in the X-direction. The brake shoe 20*b* of the left brake 20 makes contact with a tire 13*a* of the left rear wheel 13 when moving backward in the X-direction. The left rear wheel 13 is braked by a frictional force between the brake shoe 20*b* and the tire 13*a*.

It should be noted here that the brake shoe 20*b* of the left brake 20 moves toward the left rear wheel 13 when the wheelchair user operates the lever 20*a* (see FIG. 1) as well as when the engaging portion 22 is engaged with the vehicle body member of the vehicle (when the engaging portion 22 makes an attitude change from the disengagement attitude to the engagement attitude). The relationship between the pivot (attitude change) of the engaging portion 22 and the braking by the left brake 20 will be described later.

3. Structure of Engaging Portion 22

Figure 3:
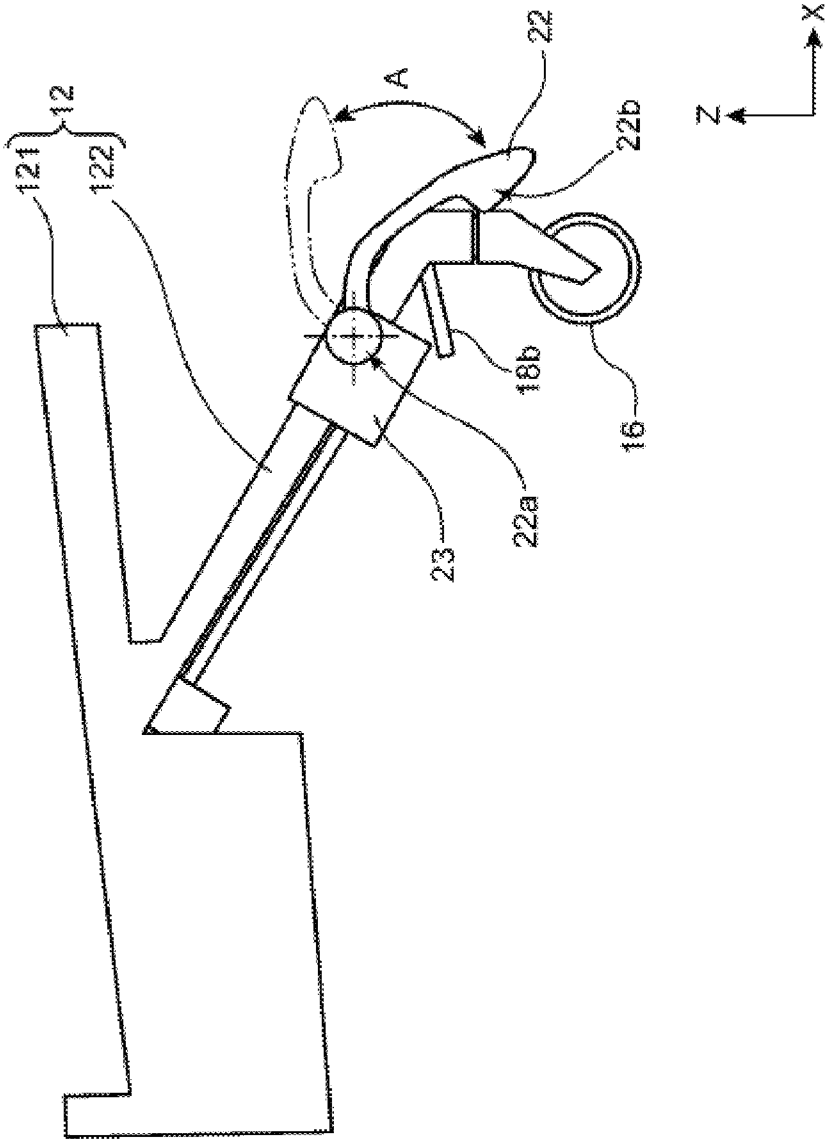
FIG. 3 is a side view illustrating the movable form of an engaging portion of the wheelchair.

FIG. 3 is a side view illustrating the movable form (form of attitude change) of the engaging portion 22 of the wheelchair 1.

As illustrated in FIG. 3, the engaging portion 22 is attached to the mount portion 22*a* on the outer surface (the paper surface of FIG. 3) in the front portion of the sub-frame 122. The engaging portion 22 extends forward in the X-direction from the mount portion 22*a* toward a hook portion 22*b* of an arrowhead shape.

The engaging portion 22 is pivotable about the mount portion 22*a* as illustrated by arrow A. It should be noted here that the attitude of the engaging portion 22 indicated by the dot-dot-dash line is the engagement attitude and the attitude indicated by the solid line is the disengagement attitude. These attitudes of the engaging portion 22 will be described later in relation to the vehicle.

Here, a part of the coupling portion 23 is provided adjacent to the mount portion 22*a* of the engaging portion 22. Although described in detail later, the coupling portion 23 can transmit the movement of the engaging portion 22 to the brake 20 according to the pivot angle (the attitude change between the engagement attitude and the disengagement attitude) of the engaging portion 22.

4. Structure of Coupling Portion 23

Figure 4:
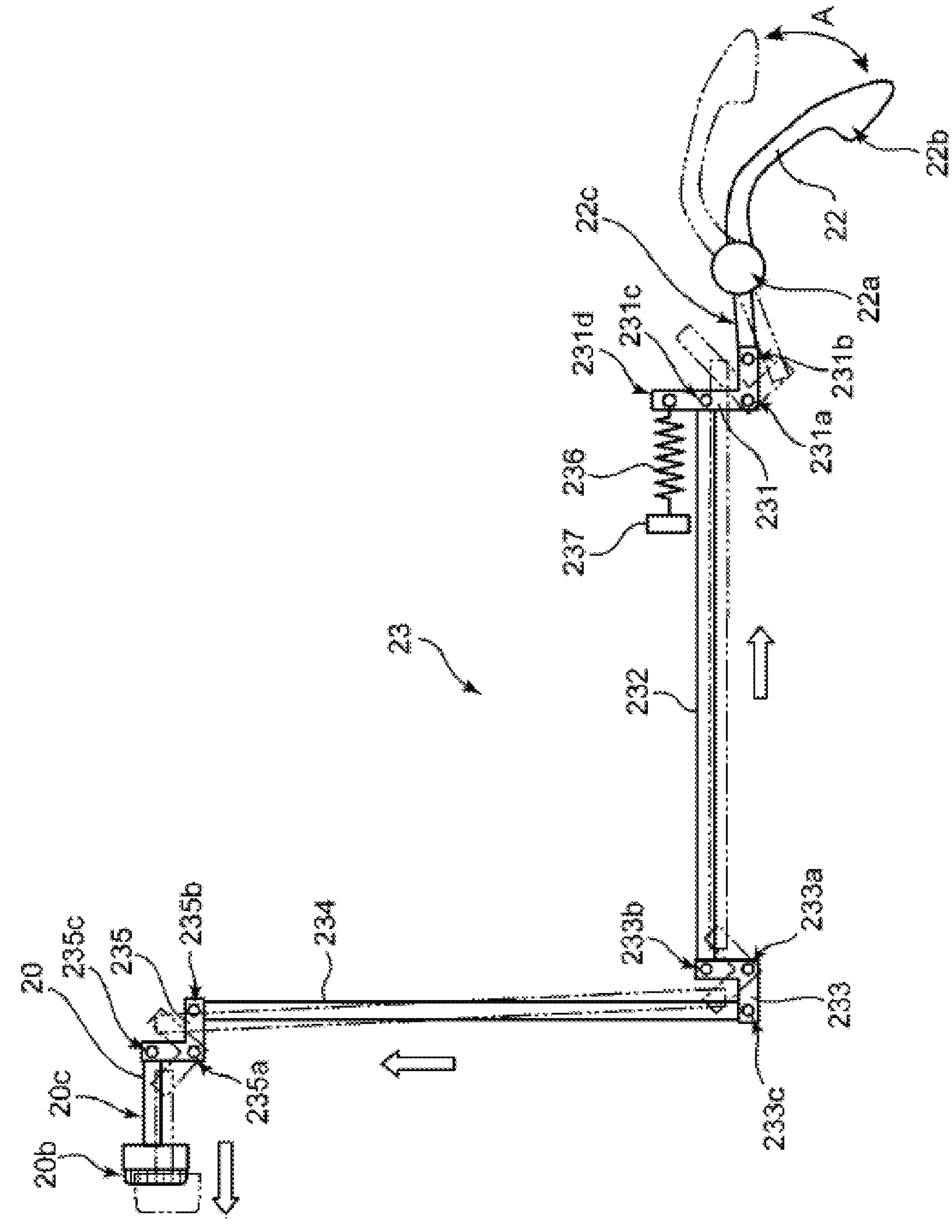
FIG. 4 is a schematic view illustrating the structure of a coupling portion that couples the engaging portion and the left brake to each other.

FIG. 4 is a schematic view illustrating the structure of the coupling portion 23 that couples the engaging portion 22 and the left brake 20 to each other.

As illustrated in FIG. 4, the coupling portion 23 has links 232 and 234 and joints 231, 233, and 235. The joints 231, 233, and 235 are L-shaped in a plan view. The joint 231 is rotatable about a fulcrum 231*a*, the joint 233 is rotatable about a fulcrum 233*a*, and the joint 235 is rotatable about a fulcrum 235*a*.

The links 232 and 234 are rod-shaped members. One end portion of the link 232 is pivotally supported at a mount position 231*c* at which the arm portion of the joint 231 is mounted and the other end portion is pivotally supported at a mount position 233*b* at which the arm portion of the joint 233 is mounted.

One end portion of the link 234 is pivotally supported at a mount position 233*c* at which the arm portion of the joint 233 is mounted and the other end portion is pivotally supported at a mount position 235*b* at which the arm portion of the joint 235 is mounted.

Here, the end portion of the connecting portion 22*c* of the engaging portion 22 is pivotally supported at a mount position 231*b* of the arm portion of the joint 231. The connecting portion 22*c* of the engaging portion 22 pivots about the mount portion 22*a* of the engaging portion 22.

In addition, a spring 236 is attached to the end portion 231*d* of the arm portion of the joint 231. The other end of the spring 236 is attached to a base 237 of the coupling portion 23. The base 237 is not linked to the movement of the links 232 and 234 or the like and is fixed to the right body frame 12 of wheelchair 1.

The spring 236 biases the end portion 231*d* of the arm portion of the joint 231 toward the base 237.

A rod 20*c* of the left brake 20 is pivotally supported at a mount position 235*c* of the joint 235. The rod 20*c* has the brake shoe 20*b* in the end portion thereof and advances the brake shoe 20*b* toward or retracts the brake shoe 20*b* from the left rear wheel 13.

When the engaging portion 22 pivots as illustrated by arrow A to make an attitude change from the disengagement attitude (attitude indicated by the solid line) to the engagement attitude (attitude indicated by the dot-dot-dash line), the attitude change is transmitted to the joint 231 by the connecting portion 22*c* and the joint 231 rotates as indicated by the dot-dot-dash line. When the joint 231 rotates, the link 232 moves as indicated by the arrow and the joint 233 rotates accordingly as indicated by the dot-dot-dash line.

When the joint 233 rotates as indicated by the dot-dot-dash line, the link 234 moves as indicated by the arrow. As the link 234 moves, the joint 235 rotates as indicated by the dot-dot-dash line, and the brake shoe 20*b* moves via the rod 20*c* toward the left rear wheel 13 as indicated by the arrow.

5. Engagement of Wheelchair 1 with Vehicle 500

Figure 5:
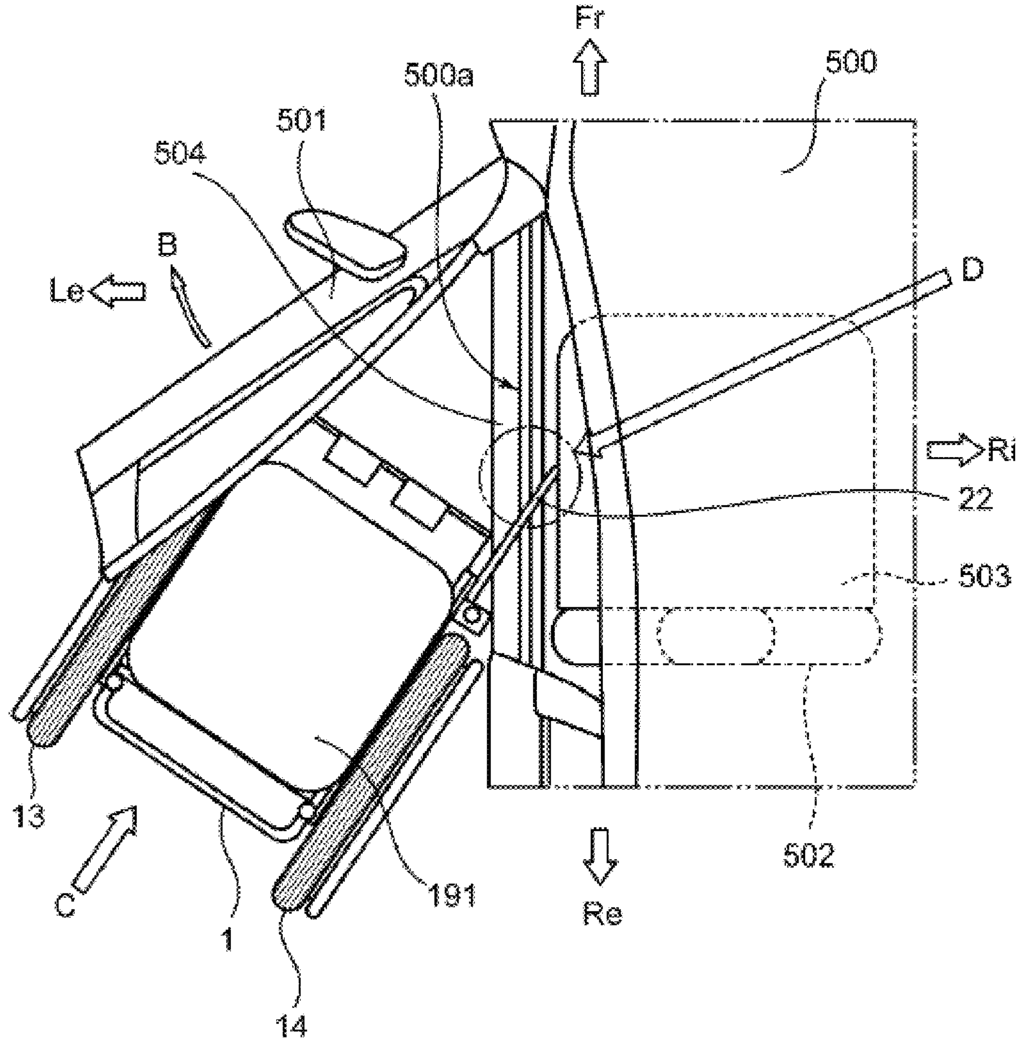
FIG. 5 is a plan view illustrating the state in which the wheelchair has been brought close to a vehicle and the engaging portion has been engaged with a side sill.

FIG. 5 is a plan view illustrating the state in which the wheelchair 1 has been brought close to a vehicle 500 and the engaging portion 22 has been engaged with a side sill 504.

Figure 6:
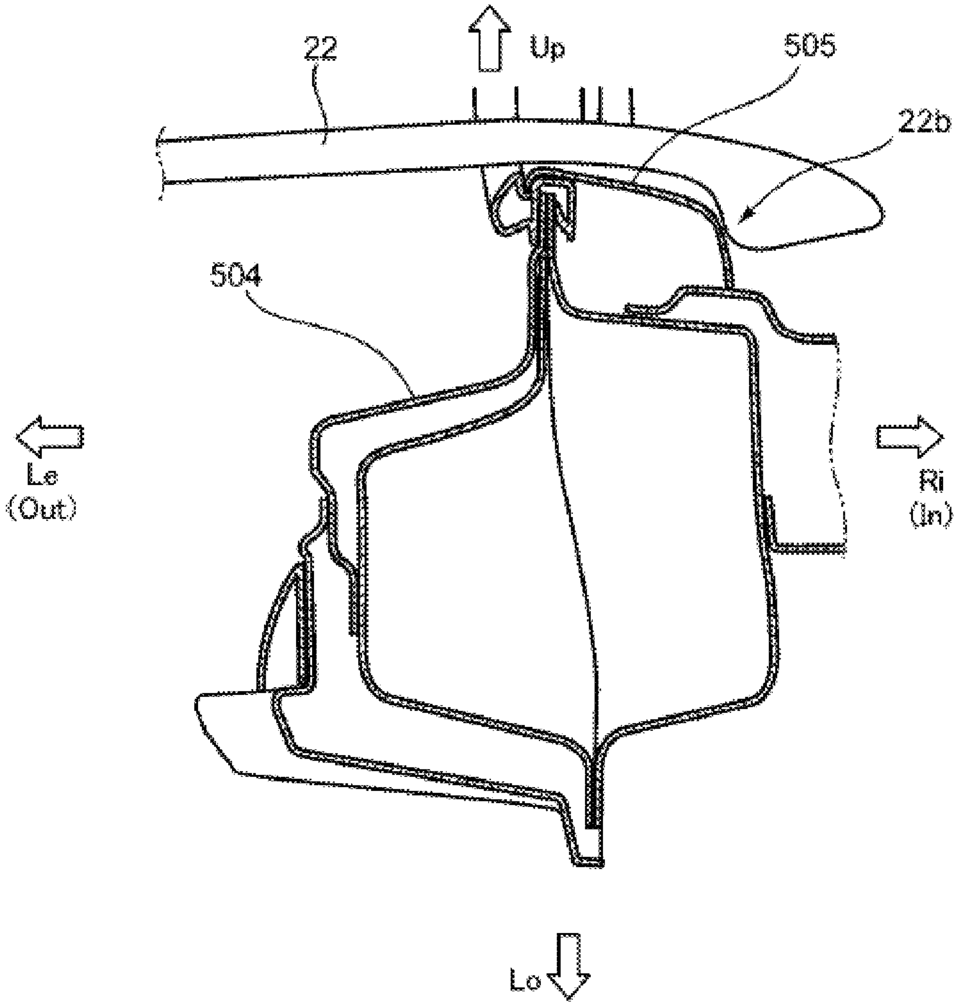
FIG. 6 is a sectional view illustrating the state in which the engaging portion has been engaged with the side sill of the vehicle.

FIG. 6 is a sectional view illustrating the state in which the engaging portion 22 has been engaged with the side sill 504 of the vehicle 500.

As illustrated in FIG. 5, when the wheelchair user transfers between a seating portion 503 of a seat 502 of the vehicle 500 and a seat cushion 191 (seating portion 19) of the wheelchair 1, the wheelchair user opens the door (for example, the left door in this embodiment) 501 of the vehicle 500 as indicated by arrow B and brings the wheelchair 1 close to the boarding gate (opening) 500*a* as indicated by arrow C.

Next, the wheelchair user or the caregiver engages the engaging portion 22 with the side sill 504 of the vehicle 500 (in the portion indicated by arrow D) by operating the engaging portion 22, and applies the brakes 20 and 21 of the wheelchair 1 by operating the levers 20*a* and 21*a*. This engages the wheelchair 1 with the vehicle 500. It should be noted here that the wheelchair 1 is not engaged with the vehicle 500 when the attitude of the engaging portion 22 is the disengagement attitude, and the wheelchair 1 is engaged with the vehicle 500 when the attitude of the engaging portion 22 is the engagement attitude.

By the way, the wheelchair user or the caregiver may forget to apply the brakes 20 and 21 of the wheelchair 1. The braking of the wheelchair 1 in such a case will be described later.

As illustrated in FIG. 6, in the engaging portion 22 of the wheelchair 1, the hook portion 22*b* of the engaging portion 22 is engaged with the side sill (structural member) 504 of the vehicle 500 from above. The top of the side sill 504 is covered with an interior trim 505. The hook portion 22*b* of the engaging portion 22 is engaged with the side sill 504 with the interior trim 505 sandwiched therebetween.

6. Engaging Portion 22 and Wheel 13 Braked in Conjunction with the Engagement of Engaging Portion 22

Figure 7:
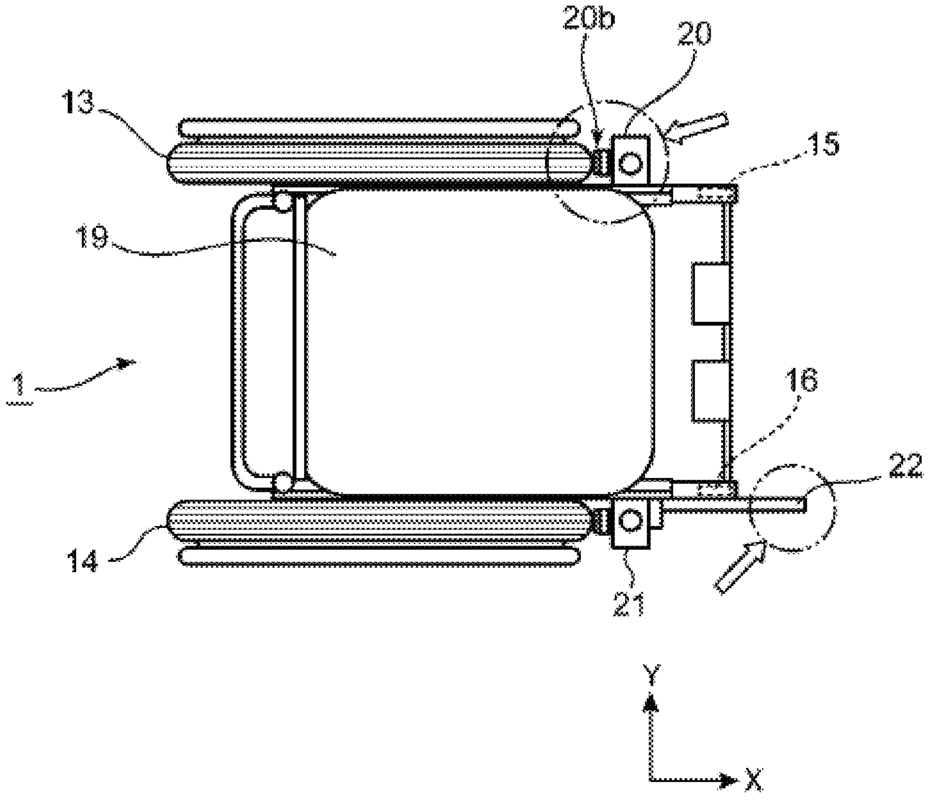
FIG. 7 is a plan view illustrating the positional relationship between the engaging portion engaged with the side sill and the wheel to be braked.

FIG. 7 is a plan view illustrating the positional relationship between the engaging portion 22 and the wheel 13 to be braked in the wheelchair 1.

As illustrated in FIG. 7, the engaging portion 22 is disposed in the front portion on the right side of the wheelchair 1. When the wheelchair user or the like engages the hook portion 22*b* of the engaging portion 22 with the side sill 504 of the vehicle 500 by operating the engaging portion 22 (when the engaging portion 22 makes an attitude change from the disengagement attitude to the engagement attitude), the left brake 20 is operated by the movement of the links 232 and 234 and the joints 231, 233, and 235 of the coupling portion 23. Accordingly, the brake shoe 20*b* of the left brake 20 makes contact with and brakes the left rear wheel 13.

Here, in the wheelchair 1 according to the embodiment, the wheel (left rear wheel 13) that is farthest from the engaging position (the portion surrounded by the dot-dot-dash line on the right side in the Y-direction) of the engaging portion 22 in the side sill 504 of the vehicle 500 brakes.

7. Effects

In the wheelchair 1 according to the embodiment, when the engaging portion 22 is engaged with the side sill 504 of the vehicle 500 (when the engaging portion 22 makes an attitude change from the disengagement attitude to the engagement attitude), the left brake 20 brakes the left rear wheel 13 in conjunction with the attitude change. Accordingly, even if the wheelchair user or the caregiver forgets to apply the brakes 20 and 21 and the wheelchair user tries to transfer to the vehicle 500, the wheelchair user can transfer stably since the left brake 20 of the wheelchair 1 brakes the left rear wheel 13.

In addition, in the wheelchair 1 according to the embodiment, by braking the wheel (left rear wheel 13) that is farthest from the engagement position (position indicated by arrow D in FIG. 5) of the engaging portion 22 engaged with the side sill 504 of the vehicle 500 in plan view of the wheelchair 1 as seen from above as illustrated in the FIG. 7, the movement such as the rotation of the wheelchair 1 in plan view can be effectively stopped. That is, even if the force applied to the wheelchair 1 tries to rotate the wheelchair 1 about the engaging position described above in the vehicle 500 when the wheelchair user transfers, the movement such as the rotation of the wheelchair 1 can be Effectively Stopped by Braking the Left Rear Wheel 13.

[First Modification]

1. Structure of Wheelchair 2

Figure 8:
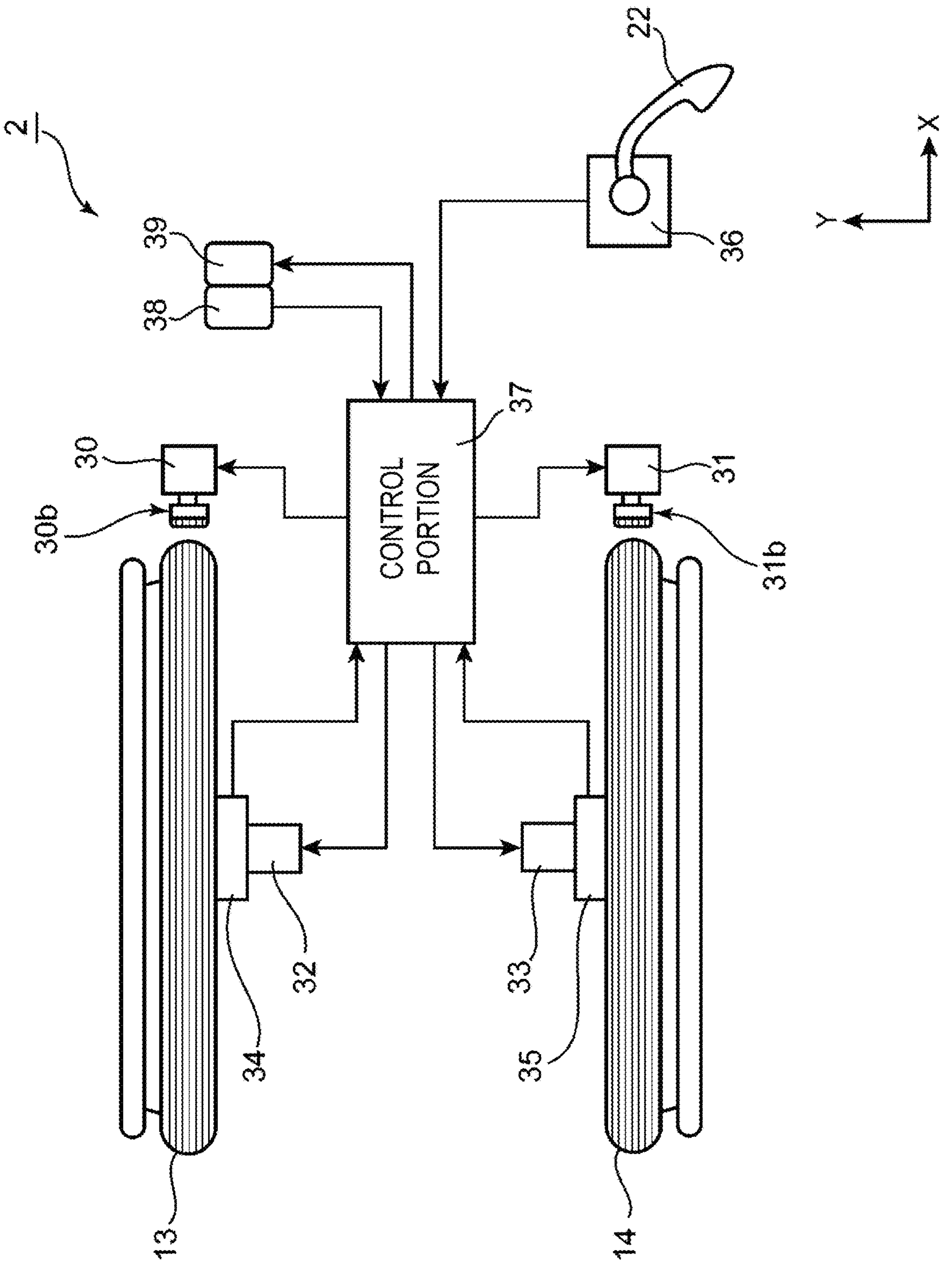
FIG. 8 is a schematic view illustrating the structure of a wheelchair according to a first modification.

FIG. 8 is a schematic view illustrating the structure of a wheelchair 2 according to a first modification. It should be noted here that FIG. 8 schematically illustrates the structure of the wheelchair 2 to make the difference from the wheelchair 1 according to the embodiment described above easy to understand and the portion not illustrated may have the same structure as the wheelchair 1 according to the embodiment.

As illustrated in FIG. 8, the wheelchair 2 according to the modification includes the rear wheels 13 and 14, the engaging portion 22, the brakes 30 and 31, driving motors (driving sources) 32 and 33, torque sensors 34 and 35, an engagement sensor (detection portion) 36, a control portion 37, an input portion 38, and an output portion 39.

The left brake 30 has a brake shoe 30*b*. The brake shoe 30*b* can be advanced or retracted by an actuator (not illustrated) or the like. The left rear wheel 13 is braked when the brake shoe 30 is advanced and makes contact with the tire of the left rear wheel 13.

The right brake 31 also has a brake shoe 31*b*. The brake shoe 31*b* of the right brake 31 can be also advanced or retracted by an actuator (not illustrated) or the like. The right rear wheel 14 is braked when the brake shoe 31*b* is advanced and makes contact with the tire of the right rear wheel 14.

It should be noted here that the brakes 30 and 31 can brake the wheels 13 and 14 when the wheelchair user or the like performs an input operation via the input portion 38.

The left torque sensor 34 detects the torque input to the left rear wheel 13 and sends the detected information (detection of the input torque and the torque value) to the control portion 37. The right torque sensor 35 detects the torque input to the right rear wheel 14 and sends the detected information (detection of the input torque and the torque value) to the control portion 37.

The left driving motor 32 is attached to the left rear wheel 13, generates the driving force for assisting the rotation of the left rear wheel 13, and applies the generated torque to the left rear wheel 13. Specifically, the left driving motor 32 generates the driving force for assisting the rotation of the left rear wheel 13 based on an instruction from the control portion 37 having received an assist instruction from the wheelchair user, and applies the generated driving force to the left rear wheel 13.

The right driving motor 33 is attached to the right rear wheel 14, generates the driving force for assisting the rotation of the right rear wheel 14, and applies the generated torque to the right rear wheel 14. Specifically, the right driving motor 33 generates the driving force for assisting the rotation of the right rear wheel 14 based on an instruction from the control portion 37 having received an assist instruction from the wheelchair user, and outputs the generated driving force to the right rear wheel 14.

It should be noted here that the assist instruction from the wheelchair user is issued by when, for example, the wheelchair user applies the force for rotating the wheels 13 and 14, the torque generated by this force is detected by the torque sensors 34 and 35, and the detected information is sent to the control portion 37.

An engagement sensor 36 is attached to the mount portion 22*a* of the engaging portion 22 (not illustrated in FIG. 8), detects an attitude change from the disengagement attitude to the engagement attitude of the engaging portion 22 when the engaging portion 22 is engaged with the side sill 504 of the vehicle 500, and sends the detected information to the control portion 37.

The control portion 37 (e.g., controller) has a microprocessor including a CPU, a RAM, a ROM, and the like. The functionality of the elements disclosed herein including but not limited to the control portion/controller 37 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. The control portion 37 also controls the braking of the wheels 13 and 14. This control method will be described later.

The input portion 38 receives an input from the wheelchair user and receives, for example, an input of the selection of a driving mode or the like. The output portion 39 outputs information to the wheelchair user and outputs, for example, information such as the selected driving mode and the remaining capacity of the battery.

2. Braking Control

Figure 9:
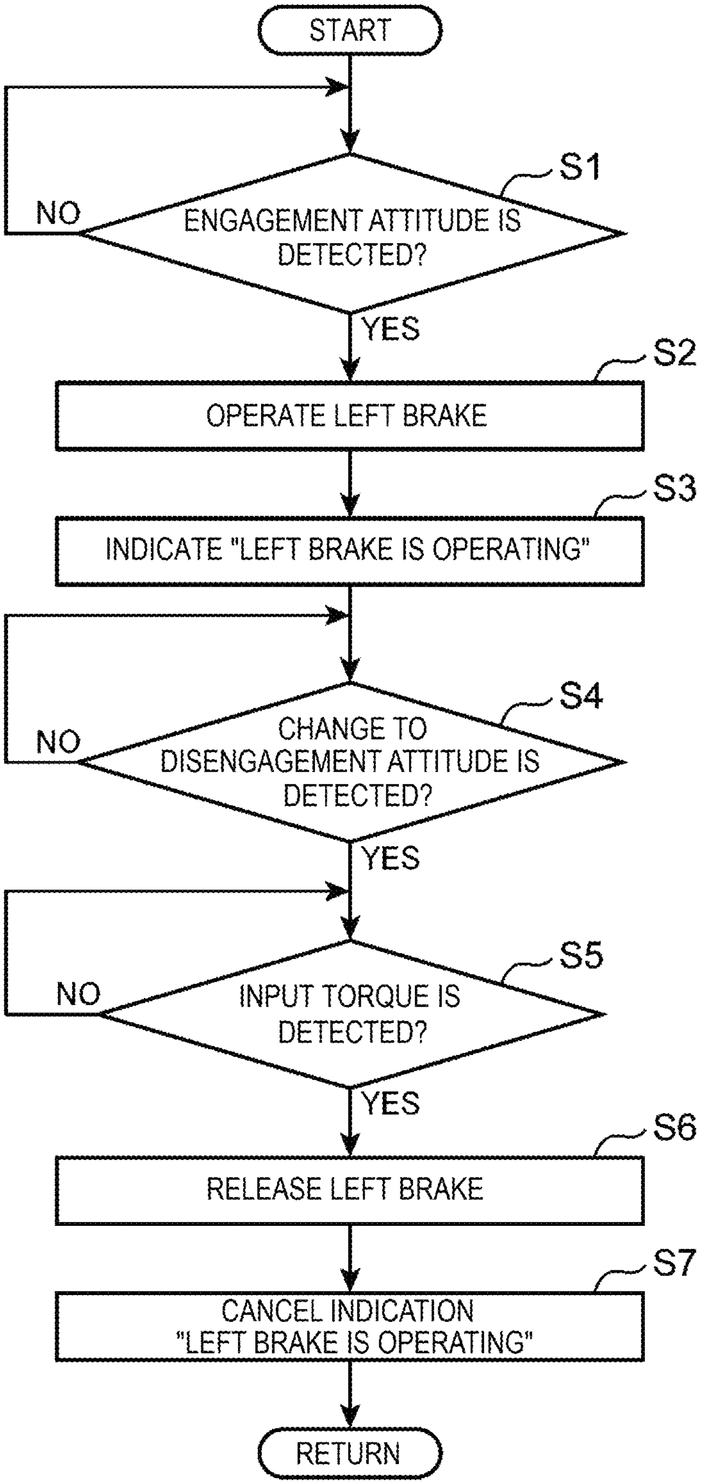
FIG. 9 is a flowchart concerning braking performed by the control portion when the wheelchair is engaged with the vehicle.

FIG. 9 is a flowchart concerning braking performed by the control portion 37 when the wheelchair 2 is engaged with the vehicle 500.

As illustrated in FIG. 9, the control portion 37 determines whether the engaging portion 22 is engaged with the side sill 504 by an operation of the wheelchair user or the like based on the input information from the engagement sensor 36 (step S1). In other words, the control portion 37 determines whether the engaging portion 22 has made an attitude change from the disengagement attitude to the engagement attitude.

When detecting the engagement state (the state in which the engaging portion 22 has made an attitude change from the disengagement attitude to the engagement attitude) (Yes in step S1), the control portion 37 operates the left brake 30 (step S2). As a result, the left brake 30 operates and the brake shoe 30*b* makes contact with the tire of the left rear wheel 13 and brakes the left rear wheel 13 even if the wheelchair user or the like forgets to apply the brakes 30 and 31.

After the brake shoe 30*b* of the left brake 30 advances and makes contact with the tire of the left rear wheel 13, message "The left brake is operating" appears on the output portion 39 (step S3).

The control portion 37 maintains the state in which the left brake 30 is applied until the control portion 37 receives the detected information of the disengagement state (attitude change of the engaging portion 22 from the engagement attitude to the disengagement attitude) from the engagement sensor 36 (No in step S4).

The engagement sensor 36 detects that the engagement has been released based on the angle of the engaging portion 22 or the like when the wheelchair user or the like has released the engagement between the engaging portion 22 and the side sill 504 of the vehicle 500. Then, when receiving the detected information (detected information indicating that the engaging portion 22 has made an attitude change from the engagement state to the disengagement state (Yes in step S4)) indicating disengagement, the control portion 37 further maintains the state in which the left brake 30 is applied until receiving the detected information indicating the detection of the torque from the torque sensors 34 and 35 (No in step S5).

When receiving the detected information indicating the detection of the torque from the left torque sensor 34 or the right torque sensor 35 (Yes in step S5), the control portion 37 retracts the brake shoe 30*b* of the left brake 30 and releases the braking of the left rear wheel 13 (step S6). Then, the control portion 37 causes the output portion 39 to cancel the message "The left brake is operating" (step S7).

3. Effects

The wheelchair 2 according to the modification can also obtain the same effect as the wheelchair 1 according to the embodiment described above since the left rear wheel 13 is braked by the left brake 30 when the engaging portion 22 makes an attitude change from the disengagement attitude to the engagement attitude by engaging the engaging portion 22 with a vehicle body member such as the side sill 504 of the vehicle 500.

In addition, in the wheelchair 2 according to the modification, since the braking state of the left brake 30 is not released (steps S4 and S5 in FIG. 9) when the engagement of the engaging portion 22 is simply released (the engaging portion 22 simply makes an attitude change from the engagement attitude to the disengagement attitude) and the braking state of the left rear wheel 13 is released when the engagement of the engaging portion 22 is released and the torque input to the torque sensor 34 and 35 is detected, the wheelchair 2 is prevented from moving undesirably when the engaging portion 22 is simply released, thereby advantageously ensuring higher safety.

[Second Modification]

Figure 10:
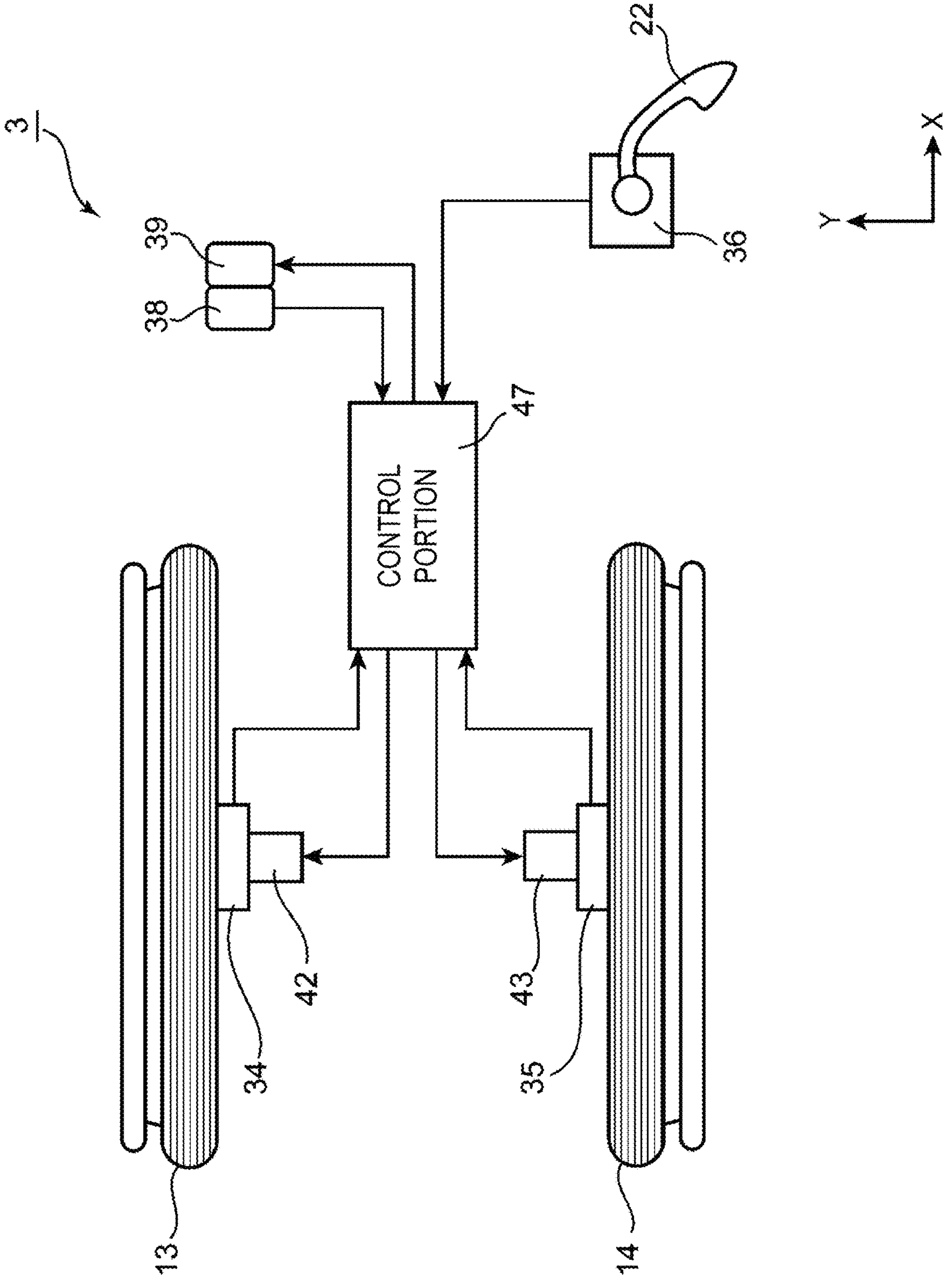
FIG. 10 is a schematic view illustrating the structure of a wheelchair according to a second modification.

FIG. 10 is a schematic view illustrating the structure of a wheelchair 3 according to a second modification. It should be noted here that FIG. 10 schematically illustrates the structure of the wheelchair 3 to make the difference from the wheelchair 1 according to the embodiment described above easy to understand and the portion not illustrated may have the same structure as the wheelchair 1 according to the embodiment. In addition, in the following, the description overlapping with the embodiment and the first modification described above will be omitted.

As illustrated in FIG. 10, the wheelchair 3 according to the modification includes the rear wheels 13 and 14, the engaging portion 22, driving motors (driving sources) 42 and 43, the torque sensors 34 and 35, the engagement sensor (detection portion) 36, a control portion 47, the input portion 38, and the output portion 39.

The left driving motor 42 is a so-called motor with an electromagnetic brake and is attached to the left rear wheel 13. The left driving motor 42 according to the modification is also a driving source that generates the driving force for assisting the rotation of the left rear wheel 13. As in the left driving motor 32 according to the first modification described above, when an assist instruction from the wheelchair user is input, the left driving motor 42 also generates the driving force for assisting the rotation of the left rear wheel 13 based on an instruction from the control portion 47 and applies the generated driving force to the left rear wheel 13.

The right driving motor 43 is also a motor with an electromagnetic brake and is attached to the right rear wheel 14. The right driving motor 43 is a driving source that generates the driving force for assisting the rotation of the right rear wheel 14. When an assist instruction from the wheelchair user is input, the right driving motor 43 also generates a driving force for assisting the rotation of the right rear wheel 14 based on an instruction from the control portion 47 and applies the generated driving force to the right rear wheel 14.

The control portion 47 (e.g., controller) has a microprocessor including a CPU, a RAM, a ROM, and the like. The control portion 47 also makes control concerning the braking of the wheels 13 and 14 using the brakes built into the driving motors 42 and 43. Specifically, the control portion 47 determines whether the engaging portion 22 has been engaged with the side sill (vehicle body member) 504 of the vehicle 500 (whether the engaging portion 22 has made an attitude change from the disengagement attitude to the engagement attitude) and, when determining that the engagement state has been detected (when determining that the engaging portion 22 has made an attitude change from the disengagement attitude to the engagement attitude), applies the brakes built in the left driving motor 42 and the right driving motor 43. This brakes the rotation of the left driving motor 42 and brakes the left rear wheel 13 even if the wheelchair user or the like forgets to apply the brake.

Here, the wheelchair user or the like can brake the wheelchair by applying the brakes of the driving motors 42 and 43 according to the input from the input portion 38.

It should be noted here that the same control as in the first modification described above can be performed to release the braking state.

The wheelchair 3 according to the modification can also obtain the same effect as the wheelchair 1 according to the embodiment and the wheelchair 2 according to the first modification described above because the rear wheels 13 and 14 are braked by using the brakes built in the driving motors 42 and 43 when the engaging portion 22 is engaged with a vehicle body member such as the side sill 504 of the vehicle 500 by an operation of the wheelchair user or the like.

[Other Modifications]

Although the left rear wheel 13 is braked when the engaging portion 22 makes an attitude change from the disengagement attitude to the engagement attitude because the engaging portion 22 is engaged with the side sill 504 of the vehicle 500 in the embodiment and the first modification described above, the present disclosure is not limited to these examples. For example, both the left and right rear wheels 13 and 14 may be braked as in the second modification described above or the right rear wheel 14 and the front wheels 15 and 16 may be braked.

Although motors with an electromagnetic brake are adopted as the driving motors 42 and 43 in the second modification described above, the present disclosure is not limited to this example. For example, a motor with an attached brake can be adopted.

In addition, even if a driving motor with a built-in or attached brake is not used, the movement such as the rotation of the wheelchair can be suppressed by monitoring the torque input to the wheel and applying the torque that has the same magnitude as the applied torque and is directed opposite to the applied torque when the engaging portion is engaged with a vehicle body member such as the side sill.

Although one engaging portion 22 is provided in the sub-frame 122 of the right body frame 12 in the embodiment and the first and second modifications described above, the present disclosure is not limited to these examples. For example, the engaging portion may be provided in the main frame 121 of the right body frame 12 or the armrest (not illustrated). Alternatively, the engaging portion may be provided in the left body frame 11. Furthermore, a plurality of engaging portions may be provided.

Although the wheelchair user is transferred after the left door 501 of the vehicle 500 is opened in the embodiment described above, the present disclosure is not limited to this example. For example, the wheelchair user may be transferred to the vehicle after the right door is opened or the wheelchair user may be transferred to the vehicle after one of the rear doors of the vehicle is opened. Furthermore, the wheelchair user may be transferred to the vehicle after the rear gate is opened.

Although the side sill 504 is used as an example of a vehicle body member of the vehicle 500 in the embodiment described above, the present disclosure is not limited to this example. For example, various portions including vehicle body members around the opening, such as the seat frame and the door, may be the engagement targets.

Although the structure having the coupling portion 23 including the links 232 and 234 and the joints 231, 233, and 235 is adopted in the embodiment described above, the present disclosure is not limited to this example. For example, the engaging portion and the brake may be coupled to each other via a cable.

Although not only the release of the engagement of the engaging portion 22 with the side sill 504 (not only the attitude change of the engaging portion 22 from the engagement attitude to the disengagement attitude), but also the torque input to the wheels 13 and 14 is the condition for releasing the braking in the first and second modifications described above, the present disclosure is not limited to this example and only the attitude change of the engaging portion from the engagement attitude to the disengagement attitude may be the condition for releasing the braking of the wheels.

Alternatively, instead of the torque input as in the first and second modifications described above, a signal input (wired or wireless input) from the wheelchair user may be adopted as the condition for releasing the braking.

[Advantage of the Disclosure]

In the wheelchairs according to the aspects described above, the movement of the wheelchair can be reliably stopped when the wheelchair user gets on and off the vehicle and the wheelchair user can stably get on and off.

DESCRIPTION OF REFERENCE SIGNS AND NUMERALS

1, 2, 3: wheelchair
11: left body frame
12: right body frame
13: left rear wheel
20, 30: left brake (braking portion)
22: engaging portion

23: coupling portion
32, 42: left driving motor (driving source)
33, 43: right driving motor (driving source)
36: engagement sensor (detection portion)
37, 47: control portion
44: left torque sensor (torque detection portion)
45: right torque sensor (torque detection portion)
231, 233, 235: joint
232, 234: link
500: vehicle
504: side sill (vehicle body member)

What is claimed is:

1. A wheelchair comprising:
a seat on which a wheelchair user sits;
a body frame that supports the seat;
a wheel rotatably supported by the body frame;
an engager to switch between an engagement attitude for engaging a vehicle body structure that forms an opening of a vehicle and a disengagement attitude for releasing the engagement with the vehicle body structure; and
a brake to brake the wheel automatically when the engager makes an attitude change from the disengagement attitude to the engagement attitude.

2. The wheelchair according to claim 1,
wherein, in plan view of the wheelchair as seen from above, the brake brakes one of a plurality of wheels that is farthest from the engager engaged with the vehicle body structure of the vehicle, the wheel being one of the plurality of wheels.

3. The wheelchair according to claim 2, further comprising:
a coupler that has a link and a joint and directly couples the engager and the brake to each other.

4. The wheelchair according to claim 2, further comprising:
a detector to detect whether the engager is in the engagement attitude or the disengagement attitude; and
a controller to control the brake so as to brake the wheel when receiving detected information indicating that the engager is in the engagement attitude.

5. The wheelchair according to claim 4, further comprising:
a driving source to generate a driving force that assists rotation of the wheel when an assist instruction is input by the wheelchair user,
wherein the brake is built in or attached to the driving source.

6. The wheelchair according to claim 5,
wherein the controller controls the brake so as to release the braking of the wheel when the engager makes an attitude change from the engagement attitude to the disengagement attitude and the assist instruction is input by the wheelchair user.

7. The wheelchair according to claim 4, further comprising:
a driving source to generate a driving force that assists rotation of the wheel when an assist instruction is input by the wheelchair user; and
a torque detector to detect an input torque to the wheel,
wherein, when the engager makes an attitude change from the disengagement attitude to the engagement attitude and the input torque is detected, the controller controls the driving source so as to generate a torque that has a same magnitude as the input torque and is directed opposite to the input torque and applies the generated torque to the wheel, and
the driving source also functions as the brake by generating the torque directed opposite to the input torque and applying the generated torque to the wheel.

8. The wheelchair according to claim 3, further comprising:
a detector to detect whether the engager is in the engagement attitude or the disengagement attitude; and
a controller to control the brake so as to brake the wheel when receiving detected information indicating that the engager is in the engagement attitude.

9. The wheelchair according to claim 8, further comprising:
a driving source to generate a driving force that assists rotation of the wheel when an assist instruction is input by the wheelchair user,
wherein the brake is built in or attached to the driving source.

10. The wheelchair according to claim 8, further comprising:
a driving source to generate a driving force that assists rotation of the wheel when an assist instruction is input by the wheelchair user; and
a torque detector to detect an input torque to the wheel,
wherein, when the engager makes an attitude change from the disengagement attitude to the engagement attitude and the input torque is detected, the controller controls the driving source so as to generate a torque that has a same magnitude as the input torque and is directed opposite to the input torque and applies the generated torque to the wheel, and
the driving source also functions as the brake by generating the torque directed opposite to the input torque and applying the generated torque to the wheel.

11. The wheelchair according to claim 1, further comprising:
a detector to detect whether the engager is in the engagement attitude or the disengagement attitude; and
a controller to control the brake so as to brake the wheel when receiving detected information indicating that the engager is in the engagement attitude.

12. The wheelchair according to claim 11, further comprising:
a driving source to generate a driving force that assists rotation of the wheel when an assist instruction is input by the wheelchair user,
wherein the brake is built in or attached to the driving source.

13. The wheelchair according to claim 12,
wherein the controller controls the brake so as to release the braking of the wheel when the engager makes an attitude change from the engagement attitude to the disengagement attitude and the assist instruction is input by the wheelchair user.

14. The wheelchair according to claim 11, further comprising:
a driving source to generate a driving force that assists rotation of the wheel when an assist instruction is input by the wheelchair user; and
a torque detector to detect an input torque to the wheel,
wherein, when the engager makes an attitude change from the disengagement attitude to the engagement attitude and the input torque is detected, the controller controls the driving source so as to generate a torque that has a same magnitude as the input torque and is directed opposite to the input torque and applies the generated torque to the wheel, and the driving source also functions as the brake by generating the torque directed opposite to the input torque and applying the generated torque to the wheel.

15. The wheelchair according to claim 1, further comprising:

a coupler that has a link and a joint and couples the engager and the brake to each other.

16. The wheelchair according to claim 1, wherein the engager is attached to a mounting structure that is located on an outer side of a subframe of the wheelchair, and the mounting structure is located in a front region of the subframe, wherein the front region is defined relative to the direction of travel of the wheelchair, and wherein the engager extends forward in the direction of travel from the mounting structure to a hook structure having an arrowhead shape, and the hook structure engages with the vehicle body structure.

17. A wheelchair comprising:

a seat on which a wheelchair user sits;

a body frame that supports the seat;

a wheel rotatably supported by the body frame;

means for engaging to switch between an engagement attitude for engaging a vehicle body structure that forms an opening of a vehicle and a disengagement attitude for releasing the engagement with the vehicle body structure; and means for braking to brake the wheel automatically when the means for engaging makes an attitude change from the disengagement attitude to the engagement attitude.

18. The wheelchair according to claim 17, wherein, in plan view of the wheelchair as seen from above, the means for braking brakes one of a plurality of wheels that is farthest from the means for engaging engaged with the vehicle body structure of the vehicle, the wheel being one of the plurality of wheels.

19. The wheelchair according to claim 18, further comprising:

means for coupling that has a link and a joint and directs couples the means for engaging and the means for braking to each other.

20. The wheelchair according to claim 18, further comprising:

means for detecting to detect whether the means for engaging is in t engagement attitude or the disengagement attitude; and means for controlling to control the means for braking so as to brake the wheel when receiving detected information indicating that the means for engaging is in the engagement attitude.

* * * * *